(12) United States Patent
Matsuda

(10) Patent No.: US 7,638,981 B2
(45) Date of Patent: Dec. 29, 2009

(54) CHARGING DEVICE

(75) Inventor: Shoji Matsuda, Iwate-ken (JP)

(73) Assignee: Alps Electric Co., Ltd., Tokyo (JP)

(*) Notice: Subject to any disclaimer, the term of this patent is extended or adjusted under 35 U.S.C. 154(b) by 400 days.

(21) Appl. No.: 10/978,729

(22) Filed: Nov. 1, 2004

(65) Prior Publication Data

US 2005/0099158 A1 May 12, 2005

(30) Foreign Application Priority Data

Nov. 6, 2003 (JP) ............................. 2003-376849

(51) Int. Cl.
H02J 7/00 (2006.01)

(52) U.S. Cl. .................................................... 320/160
(58) Field of Classification Search ................. 320/128, 320/160
See application file for complete search history.

(56) References Cited

U.S. PATENT DOCUMENTS

| 4,467,265 | A | | 8/1984 | Hierholzer, Jr. | |
| 4,845,419 | A | * | 7/1989 | Hacker | 320/136 |
| 5,315,228 | A | * | 5/1994 | Hess et al. | 320/106 |
| 5,523,667 | A | * | 6/1996 | Feldstein | 320/118 |
| 5,617,007 | A | * | 4/1997 | Keidl et al. | 320/141 |
| 5,955,869 | A | * | 9/1999 | Rathmann | 320/132 |
| 5,982,148 | A | | 11/1999 | Mercer | |
| 6,166,521 | A | | 12/2000 | Mercer et al. | |
| 2002/0101218 | A1 | | 8/2002 | Koenck et al. | |
| 2003/0189417 | A1 | * | 10/2003 | Dias et al. | 320/134 |

FOREIGN PATENT DOCUMENTS

JP 5-284664 10/1993

OTHER PUBLICATIONS

Search Report dated Feb. 25, 2005 for European Patent Application No. 04 25 6767.

* cited by examiner

Primary Examiner—Akm E Ullah
Assistant Examiner—Jue Zhang
(74) Attorney, Agent, or Firm—Brinks Hofer Gilson & Lione

(57) ABSTRACT

A circuit device contains a main circuit structure for main charging and a setting unit incorporated into the circuit structure for setting a weak current. The charging device includes a power-source for supplying a charging current to a secondary battery, an operational amplifier for controlling the supply of the charging current by the power source, and a power element for controlling the supply of the charging current to the secondary battery. Main charging is performed on the secondary battery by supplying a normal current to the secondary battery as the charging current. Trickle charging is performed on the secondary battery by supplying a weak current to the secondary battery as the charging current.

7 Claims, 2 Drawing Sheets

US 7,638,981 B2

CHARGING DEVICE

This application claims the benefit of priority to Japanese Patent Application No. 2003-376849, filed on Nov. 6, 2003, herein incorporated by reference.

BACKGROUND OF THE INVENTION

1. Field of the Invention

The present invention relates to a charging device, and more particularly, to a charging device capable of performing main charging on a secondary battery by supplying a normal current to the secondary battery as a charging current and of performing trickle charging on the secondary battery by supplying a weak current to the secondary battery as the charging current.

2. Description of the Related Art

Conventionally, there has been disclosed a charging device having a function for mainly charging a secondary battery by supplying a normal current (a large current) to the secondary battery as a charging current and a function for trickle-charging the secondary battery by supplying a weak current to the secondary battery as the charging current.

In general, when it is impossible for a secondary battery to generate the original electromotive force due to the deterioration of the performance of the secondary battery, the trickle charging is performed to restore the original performance of the secondary battery.

FIG. 2 is a circuit diagram illustrating a circuit structure of a conventional charging device 1 having the trickle charging function. The charging device 1 has a main charging circuit 3 for performing the main charging on a secondary battery 2 and a trickle charging circuit 4 for performing the trickle charging on the secondary battery 2.

In the main charging circuit 3, a charging current detecting resistor 7 is provided on the downstream side of a terminal 6 of a power source 5, and the output side of the charging current detecting resistor 7 is connected to an inverting input terminal of an operational amplifier 8 through a resistor $r_1$. The operational amplifier 8 controls the value of the charging current while detecting the current flowing through the charging current detecting resistor 7.

Meanwhile, a non-inverting input terminal of the operational amplifier 8 is connected to the ground through a resistor $r_2$. In addition, a resistor $r_3$ is provided between the non-inverting input terminal of the operational amplifier 8 and the input side of the charging current detecting resistor 7.

Further, the output side of the charging current detecting resistor 7 is connected to an emitter of a power transistor $Tr_1$ serving as a power element for controlling the supply of the normal current to the secondary battery 2, and a collector of the power transistor $Tr_1$ is connected to an anode of the secondary battery 2. In addition, a resistor $r_4$ is provided between a base and the emitter of the power transistor $Tr_1$.

Furthermore, the base of the power transistor $Tr_1$ is connected to an emitter of a transistor $Tr_2$ for controlling a base current of the power transistor $Tr_1$, and a collector of the transistor $Tr_2$ is connected to an output terminal of the operational amplifier 8 through a resistor $r_5$. In addition, a resistor $r_6$ is provided between a base and the emitter of the transistor $Tr_2$.

Moreover, an end of a resistor $r_7$ is connected to the base of the transistor $Tr_2$, and the other end of the resistor $r_7$ is connected to a collector of a transistor $Tr_3$ for controlling the base current of the transistor $Tr_2$.

An emitter of the transistor $Tr_3$ is connected to the ground, and a base thereof is connected through a resistor $r_8$ to a power supply terminal 10 for inputting a base current. In addition, a resistor $r_9$ is provided between the base and the emitter of the transistor $Tr_3$.

Further, in the trickle charging circuit 4, a resistor $r_{10}$ is provided on the downstream side of the terminal 6 of the power source 5, and the output side of the resistor $r_{10}$ is connected to an emitter of a power transistor $Tr_4$ serving as a power element for controlling the supply of the weak current to the secondary battery 2.

A collector of the power transistor $Tr_4$ is connected to the anode of the secondary battery 2, and a diode 11 is provided between a base of the power transistor $Tr_4$ and the downstream side of the terminal 6 of the power source 5. In addition, an end of a resistor $r_{11}$ is connected to the base of the power transistor $Tr_4$, and the other end of the resistor $r_{11}$ is connected to a collector of a transistor $Tr_5$ for controlling the base current of the power transistor $Tr_4$.

A base of the transistor $Tr_5$ is connected to a base current input terminal 12 through a resistor $r_{12}$. In addition, a resistor $r_{13}$ is connected between an emitter of the transistor $Tr_5$ and an end of the resistor $r_{12}$ connected to the base thereof. Further, the collector of the transistor $Tr_5$ is connected to the ground.

According to the charging device having the above-mentioned structure, when the main charging is performed on the secondary battery 2, a base current is supplied to the transistor $Tr_3$ such that the transistors $Tr_3$ and $Tr_2$ and the power transistor $Tr_1$ are turned on.

Then, a normal current of about 700 mA is supplied as the charging current from the power source 5 to the secondary battery 2 through the emitter and the collector of the power transistor $Tr_1$, thereby performing the main charging on the secondary battery 2.

In this case, since a base current is not supplied to the base of the transistor $Tr_5$, the transistor $Tr_5$ and the power transistor $Tr_4$ are maintained in an off state.

Subsequently, when the trickle charging is performed on the secondary battery 2, the base current is supplied to the base of the transistor $Tr_5$ in a state in which the power transistor $Tr_1$ and the transistors $Tr_2$ and $Tr_3$ are off, so that the transistor $Tr_5$ and the power transistor $Tr_4$ are turned on.

Then, a weak current of about 50 mA is supplied as the charging current from the power source 5 to the secondary battery 2 through the emitter and the collector of the power transistor $Tr_4$, thereby performing the trickle charging on the secondary battery 2 (for example, see Japanese Unexamined Patent Application Publication No. 5-284664).

However, in the conventional charging device 1, the main charging circuit 3 is separately arranged from the trickle charging circuit 4. Therefore, the circuits must respectively have expensive power transistors $Tr_1$ and $Tr_4$ for controlling the charging current (the normal current or the weak current), which causes an increase in the costs of manufacturing the charging device.

Further, since the power transistors $Tr_1$ and $Tr_4$ in the respective circuits through which the charging current flows have high heating values, it is necessary that radiators (not shown) for radiating heat generated from the power transistors $Tr_1$ and $Tr_4$ be provided to the power transistors. $Tr_1$ and $Tr_4$ separately, which causes an increase in the number of components and an increase in manufacturing costs.

SUMMARY OF THE INVENTION

Accordingly, the present invention is designed to solve the above-mentioned problems, and it is an object of the present invention to provide a charging device capable of reducing the number of power elements required for setting a charging current, thereby achieving a reduction in size and a low manufacturing cost.

In order to achieve the above object, the present invention provides a charging device comprising: a power source for supplying a charging current to a secondary battery; an operational amplifier for controlling the supply of the charging current by the power source; and a power element for controlling the supply of the charging current to the secondary battery. Here, a main charging is performed on the secondary battery by supplying a normal current to the secondary battery as the charging current, and a trickle charging is performed on the secondary battery by supplying a weak current to the secondary battery as the charging current. Further, a circuit structure for the main charging is a main circuit structure, and a setting unit for setting the weak current is incorporated into the main circuit structure.

Therefore, according to the charging device having the above-mentioned structure, a function for controlling the supply of the weak current can be practically complemented with the main charging circuit. Thus, it is possible to reduce the number of control elements required for controlling the charging current.

Further, in the charging device according to the present invention, the setting unit sets the weak current by adjusting an offset of the operational amplifier.

According to the charging device having the above-mentioned structure, it is possible to easily set the weak current.

DESCRIPTION OF THE PREFERRED EMBODIMENT

Hereinafter, a charging device according to an embodiment of the present invention will be described with reference to FIG. 1.

Figure 1:
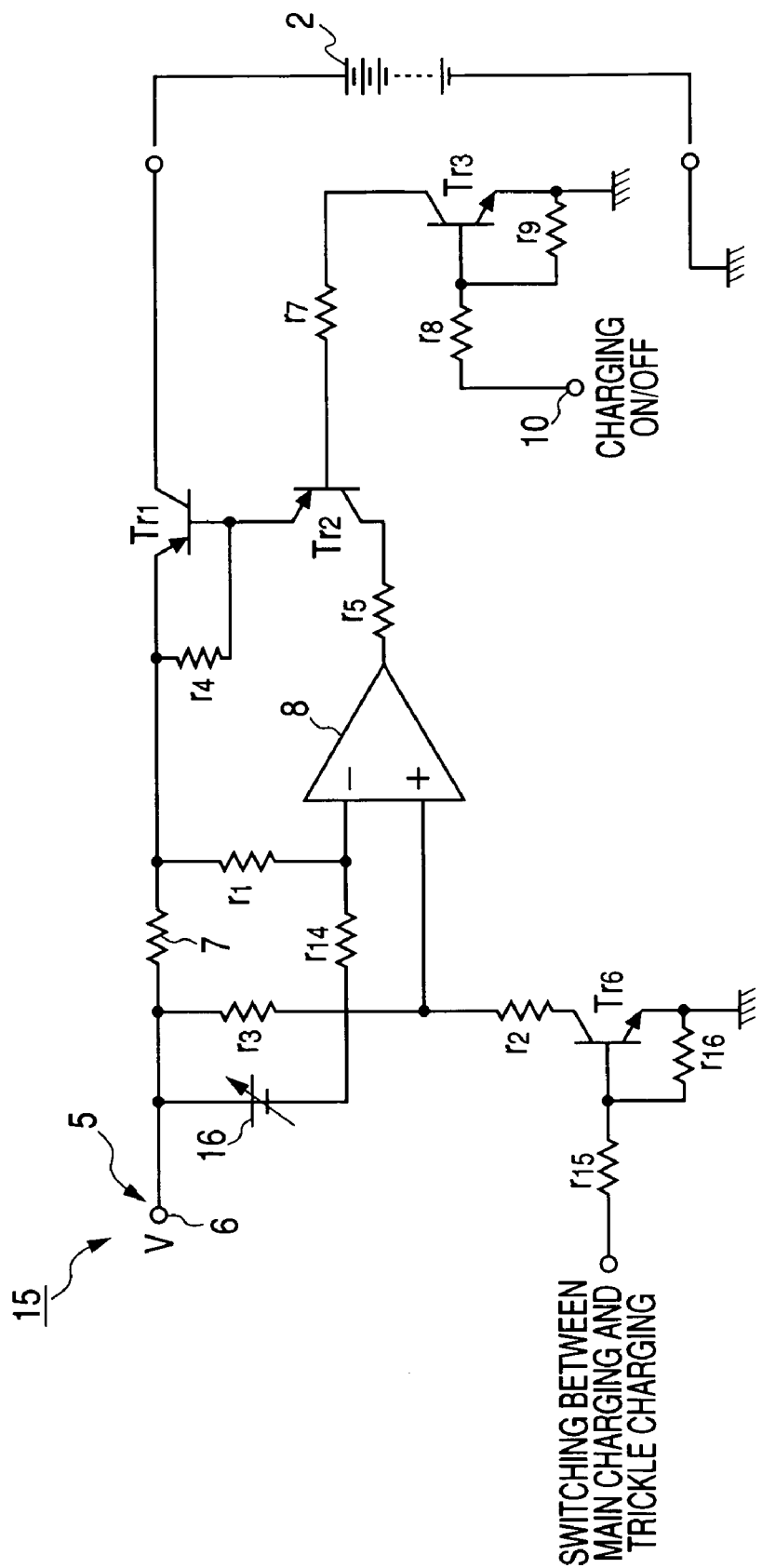
FIG. 1 is a circuit diagram illustrating a charging device according to an embodiment of the present invention.
Figure 2:
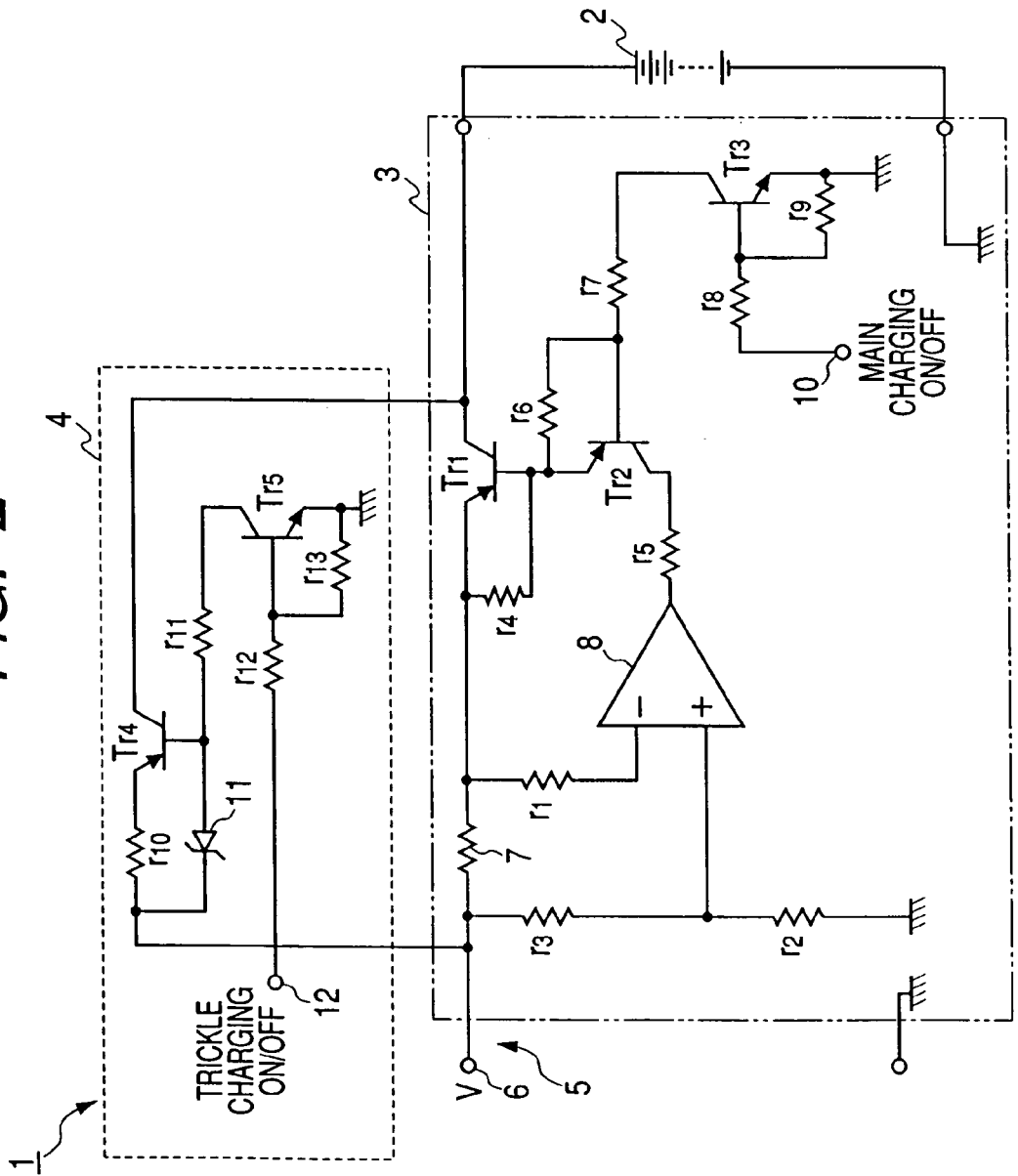
FIG. 2 is a circuit diagram illustrating an example of a conventional charging device.

In FIG. 1, the components having substantially the same basic structure as those in a conventional charging device shown in FIG. 2 have the same reference numerals.

As shown in FIG. 1, a charging device 15 according to the present embodiment comprises a power source 5 for supplying the charging current to a secondary battery 2, an operational amplifier 8 for controlling the supply of the charging current by the power source 5, and a power transistor $Tr_1$ serving as a power element for controlling the supply of the charging current to the secondary battery 2, which is basically the same structure as that of the conventional charging device.

Meanwhile, in the conventional charging device, a main charging circuit 3 for performing main charging on the secondary battery 2 is separately arranged from a trickle charging circuit 4 for performing trickle charging on the secondary battery 2. However, in the charging device 15 according to the present embodiment, these two circuits are integrated into one circuit, and a circuit structure for the main charging is a main circuit structure.

In other words, the charging device 15 according to the present embodiment does not have a power transistor $Tr_4$, a transistor $Tr_5$, a diode 11, and resistors $r_{10}$, $r_{11}$, $r_{12}$, and $r_{13}$ which constitute the conventional trickle charging circuit 4.

In the charging device 15, instead of the above-mentioned elements, a setting unit 16 is provided between a terminal 6 of the power source 5 and an inverting input terminal of the operational amplifier 8 to set a weak current when the trickle charging is performed on the secondary battery 2.

The setting unit 16 performs the setting of the weak current by adjusting the offset of the operational amplifier 8, that is, the input offset voltage (the error voltage) between the input terminals of the operational amplifier 8. In addition, when the volume of the setting unit 16 is small, it is possible to manufacture the charging device 15 at a lower cost.

Further, a resistor $r_{14}$ is provided between the inverting input terminal of the operational amplifier 8 and the setting unit 16.

Furthermore, a collector of a transistor $Tr_6$ for switching between the main charging and the trickle charging is connected to the input side of a resistor $r_2$ connected to a non-inverting input terminal of the operational amplifier 8. In addition, a resistor $r_{15}$ is connected to a base of the transistor $Tr_6$, and a resistor $r_{16}$ is provided between an emitter and the base thereof.

According to this structure, it is possible for the main charging circuit to practically have a function for controlling the supply of a weak current by slightly changing the structure of the main charging circuit, that is, by providing the setting unit 16. Therefore, it is possible to reduce the number of control elements required for controlling the charging current.

Moreover, it is possible to simply set the weak current by adjusting the offset of the operational amplifier.

Next, the effects of the present embodiment will be described.

According to the charging device 15 having the above-mentioned structure, when the main charging is performed on the secondary battery, a base current is supplied to a transistor $Tr_3$, so that the transistor $Tr_3$, transistor $Tr_2$ and the power transistor $Tr_1$ are turned on.

Further, the base current is supplied to the base of the transistor $Tr_6$ to turn on the transistor $Tr_6$.

Then, a normal current of about 700 mA is supplied as the charging current from the power source 5 to the secondary battery 2 through the emitter and the collector of the power transistor $Tr_1$, thereby performing the main charging on the secondary battery 2.

Subsequently, when the trickle charging is performed on the secondary battery 2, the transistor $Tr_6$ is turned off, and the offset of the operational amplifier 8 is adjusted by the setting unit 16.

Then, a weak current of about 50 mA is supplied as the charging current from the power source 5 to the secondary battery 2 through the emitter and the collector of the power transistor $Tr_1$, thereby performing the trickle charging on the secondary battery 2.

Therefore, according to the present embodiment, it is possible to reduce the number of power transistors, which are expensive power elements having a high heating value. Thus, it is possible to obtain the charging device 15 having a low manufacturing cost and to reduce the size of the device.

Furthermore, the present invention is not limited to the above-mentioned embodiment, but variable modifications and changes may be made by one skilled in the art without departing from the scope or spirit of the present invention.

What is claimed is:
1. A charging device comprising:
a power source to supply a charging current to a secondary battery;
an operational amplifier to control the supply of the charging current by the power source;

a power element to control the supply of the charging current to the secondary battery;

a setting unit corresponding to an adjustable voltage source, the adjustable voltage source coupled to the power source and an inverting input terminal of the operational amplifier and coupled between the power source and the inverting input terminal;

a resistor coupled in series with the adjustable voltage source and coupled between the adjustable voltage source and the inverting input terminal;

wherein a main charging is performed on the secondary battery by supplying a normal current to the secondary battery as the charging current, and a trickle charging is performed on the secondary battery by supplying a weak current, set by the setting unit, to the secondary battery as the charging current when the main charging is not performed, wherein the power element is turned on during the performance of the main charging and the trickle charging and during transition from the main charging to the trickle charging, and wherein the adjustable voltage source is set so as to adjust an input offset voltage of the operational amplifier so as to set a value of the weak current; and a switch coupled to the operational amplifier and operable to be turned off during the duration of the performance of the trickle charging.

2. The charging device according to claim 1, wherein the normal current flows through the power element during the performance of the main charging and the weak current flows through the power element during the performance of the trickle charging.

3. The charging device according to claim 1, wherein the power element comprises a bipolar junction transistor.

4. The charging device according to claim 1, wherein the switch comprises a bipolar junction transistor.

5. The charging device according to claim 1, wherein the offset of the operational amplifier comprises an input offset voltage between input terminals of the operational amplifier.

6. The charging device according to claim 1, wherein one input terminal of the operational amplifier is coupled to the setting unit and the other input terminal of the operational amplifier is coupled to the switch.

7. The charging device according to claim 6, wherein the setting unit is coupled to the power source and the one input terminal of the operational amplifier which is an inverting input terminal.

\* \* \* \* \*

UNITED STATES PATENT AND TRADEMARK OFFICE
CERTIFICATE OF CORRECTION

PATENT NO.        : 7,638,981 B2                                    Page 1 of 1
APPLICATION NO.   : 10/978729
DATED             : December 29, 2009
INVENTOR(S)       : Shoji Matsuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this

Ninth Day of November, 2010

David J. Kappos
*Director of the United States Patent and Trademark Office*